Patented Nov. 10, 1953

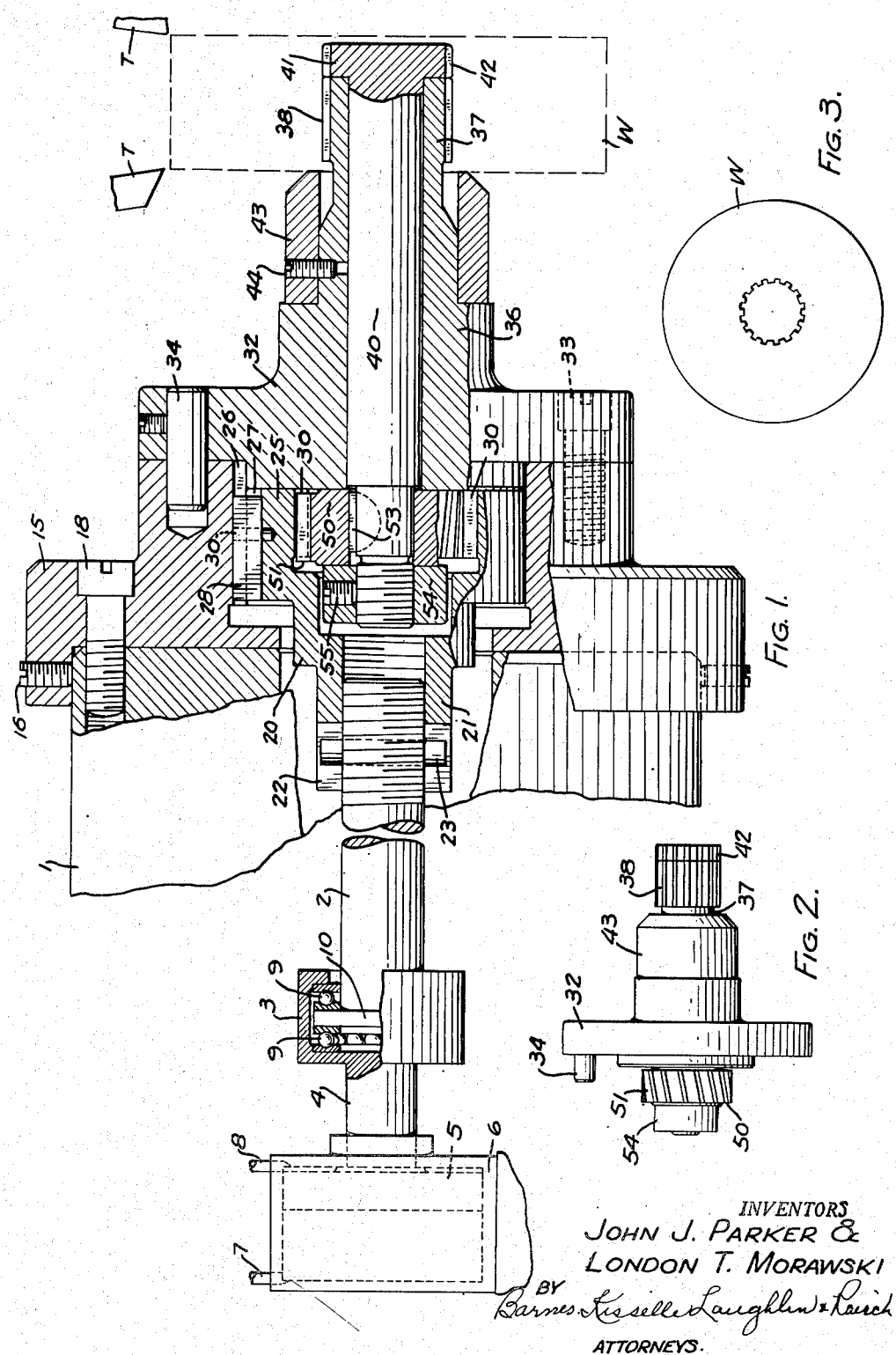

2,658,764

UNITED STATES PATENT OFFICE 2,658,764

CHUCK FOR HOLDING SPLINED WORKPIECES

John J. Parker and London T. Morawski, Detroit, Mich.

Application November 14, 1951, Serial No. 256,292

4 Claims. (Cl. 279—1)

This invention relates to a work holder or chuck for holding a work piece so that it may be rotated for the performing of machine operations thereon.

More particularly the invention is concerned with a chuck construction having quickly detachable elements so that some of the elements may be readily interchanged to thus accommodate for different types of work pieces. The holder of this invention is one arranged to be secured to a rotary element such as a spindle of a machine tool and it is arranged to engage and hold a work piece by means of a toothed or splined formation in the hub or center part of the work piece. An example of such a work piece is a gear blank having its center or hub portion provided with an internal toothed or splined formation and when such a work piece is held by its toothed or splined or center hub portion, the machine operations performed on the blank are properly positioned and concentric with the axis of the blank. Thus when the part is finished the machined portions are accurately located relative to the blank center.

A holder constructed in accordance with the invention is shown in the accompanying drawings:

Fig. 1 is a view largely in cross section showing a chuck or holder constructed in accordance with the invention and illustrating operating means therefor and a work piece.

Fig. 2 is an ensmalled elevation showing the removable and interchangeable unit.

Fig. 3 is an ensmalled view of a work piece of the type which can be held by the holder.

In Fig. 1 a rotary element, such as the spindle head of a machine tool is shown at 1. There is an operating rod 2 connected through the means of a coupling 3 to a piston 4. The piston rod 4 connects to the piston 5 in a cylinder 6 to which hydraulic medium or compressed air may be introduced through conduits 7 and 8. The piston is reciprocated by introducing a fluid into one end of the cylinder and venting the other end of the cylinder and in this manner the operating rod 2 is shifted axially. The coupling is shown as having anti-friction bearings 9 on opposite sides of the flange 10 on the rod 2 to permit of relative rotation between the rods 2 and 4 while providing the axial movement.

The chuck has an outer portion 15 arranged to be mounted on the rotary element 2 and may be centered by screws 16 and secured thereto by cap screws 18.

There is an inner member generally shown at 20 with an axially extending hub portion 21 connected to the rod 2. The connection may be by screw threads as shown and the hub portion 21 may be slotted as at 22 so that a pin 23 may be passed therethrough and through the rod 2 to prevent relative rotation and thereby to prevent detachment of the screw threads. The inner member 20 has a hollow part 25 and this inner member is slidably keyed to the outer member. For this purpose the outer member has a keyway 26 and the inner member has a keyway 27, and a key 28 fits into the two keyways. The key may be fixedly secured to the inner member by a pin 30. One or more keys may be provided. The inner member is thus axially shiftable within the outer member, this being accomplished by the introduction of the fluid into the cylinder 6.

The interior of the portion 25 is provided with helical splines 30. These are internal, helical splines, the purpose will presently appear.

The detachable and interchangeable element resides in a member 32 secured to the outer member 15 as by means of cap screws 33, and it may be accurately located by a dowel pin 34. This member has a hub portion 36 and a projecting tool supporting portion 37 provided with an external spline or tooth formation, the teeth being illustrated at 38. Rockably mounted in the hub portion 36 is a shaft 40 having a tool holding element 41 with a splined or toothed formation thereon, the teeth thereof being illustrated at 42. A collar 43 may be placed on the hub 36 and held by a screw 44, which collar may position the work piece.

The inner end of the shaft 40 has an element 50 secured thereto provided with helical teeth 51. This element is keyed to the shaft 40 as at 53 and may be securely held against axial displacement by a nut 54 threaded on the end of the shaft 40 and locked by a set screw 55.

A work piece is illustrated in dotted lines at W, the same having a central portion or hub portion provided with internal splines, while work performing tools of which three are shown, are indicated at T.

In considering the use of the device, it will be appreciated that axial shift of the member 20 causes the helical teeth 30 which are in engagement with the helical teeth 51, to rock the shaft 40 and, therefore, to rock the tool holding element 41 relative to the tool holding element 37. It will be remembered that the element 20 is keyed as at 28 to the outer member 15 so that it shifts axially without any rotary movement relative to the outer member 15. In the position shown in Fig. 1, with the element 20 retracted to the right, the teeth 42 and 38 are in substantial alignment with each other, as shown in Fig. 2. A work piece may then be positioned, as shown in Fig. 1, with its internally splined central or hub portion aligned over the teeth 38 and 42. The work piece may be axially positioned by the collar 43. Then to grip the work, the element 20 is shifted to the left as above described and due to the action of the helical teeth 30 and 51, the shaft 40 is oscillated on its axis and the teeth 38 and 42 are oscillated relative to each other thereby causing them to tightly grip the internal teeth of the work piece. With the work piece thus gripped it is accurately centralized relative to its own internal splines or teeth, and as it is rotated, one or more of the tools may be applied to the same singly or simultaneously to perform machine operations thereon. Therefore, the machine operations are accurate relative to the teeth or splines of the work piece.

When it is found necessary to use the machine for work pieces of a different size, or of a different type, it is only necessary to remove the assembled unit as shown in Fig. 2. This is done by removing the screws 33, then removing the part 32 with its shaft and tool holder 41 and splined element 50. Then another assembled unit of the same type, but having different work holding elements may be placed upon and secured to the outer element 15. Of course, the element 50 is the same in all cases as its teeth engage the teeth 30 of the element 20 which is not changed. The principal difference in the various sub-assemblies lie in the form, size and shape of the tool holding elements 37 and 41 and their teeth. Also the positioning collar 43 may be changed in accordance with the requirements of the work.

We claim:

1. A chuck for holding a work piece having a splined formation so that machine operations may be performed thereon and having an outer member having means for attachment to a rotary element such as the spindle head of a machine tool comprising, an inner member, means keying the inner member to the outer member so that it may shift axially, means for shifting the inner member axially, the inner member having helical teeth thereon; a work holding sub-assembly having a body arranged to be detachably connected to the outer member, a toothed work holding element on the body, a shaft member journalled in the body, a toothed work holding element on the shaft member located in proximity to the end of the work holding element on the body, and helical teeth on the shaft member for engagement with the helical teeth on said inner member, the helical teeth on the shaft member being readily engageable with and disengageable from the helical teeth on the inner member whereby the sub-assembly may be readily detached and a similar sub-assembly for other work pieces mounted on the outer member.

2. A chuck for holding a work piece having an internal splined formation so that machine operations may be performed thereon and having an outer member having means for attachment to a rotary element such as the spindle head of a machine tool comprising, an inner member, means keying the inner member to the outer member so that it may shift axially, means for shifting the inner member axially, the inner member having an axially disposed outwardly facing hollow formation with internal helical teeth thereon; a work holding sub-assembly having a body, means for detachably connecting the body to the outer member, a toothed work holding element on said body, a shaft member journalled in the body, a toothed work holding element on said shaft located in proximity to the end of the toothed holding element on the body, means on the shaft member having helical teeth for engagement with the helical teeth on said inner member, whereby axial shift of the inner member relatively rocks the teeth on the tool holding elements to engage and grip a work piece, said sub-assembly being readily removable whereby a similar sub-assembly may be mounted for other work pieces.

3. A chuck for holding a work piece having an internal splined formation so that machine operations may be performed thereon and having an outer member having means for attachment to a rotary element such as the spindle head of a machine tool comprising, an inner member, means keying the inner member to the outer member so that it may shift axially, means for shifting the inner member axially, the inner member having an axially disposed outwardly facing hollow formation with internal helical teeth thereon; a work holding sub-assembly having a body, means for detachably connecting the body to the outer member, a toothed work holding element on said body, a shaft member journalled in the body, a toothed work holding element on said shaft located in proximity to the end of the toothed holding element on the body, means on the shaft member having helical teeth, said means being readily shiftable into and out of the hollow formation of the inner member with the helical teeth thereon engaging with the internal helical teeth of the inner member, whereby axial shift of the inner member relatively rocks the teeth on the tool holding elements to engage and grip a work piece, said sub-assembly being readily removable whereby a similar sub-assembly may be mounted for other work pieces.

4. A chuck for holding a work piece having an outer member having means for attachment to a rotary element such as the spindle head of a machine tool and comprising, an inner member, means keying the inner member to the outer member so that the inner member may shift axially, means for shifting the inner member axially, the inner member having helical teeth thereon; a tool holding sub-assembly having a body for detachable connection to the outer member, a work holding element on the body, a shaft member rockably mounted in the body, a work holding element on the shaft member in proximity to the end of the work holding element on the body member, said work holding element on the shaft member being shiftable rockably relative to the work holding element on the body member by means of the axial shift of the inner member and the action of the engaged helical teeth to cause the work holding elements to grip a work piece, said sub-assembly being readily removable from the outer member and the helical teeth on the shaft member being readily disengaged from the helical teeth on the inner member, whereby the sub-assembly is interchangeable with similar sub-assemblies.

JOHN J. PARKER.
LONDON T. MORAWSKI.

References Cited in the file of this patent

UNITED STATES PATENTS

| Number | Name | Date |
|---|---|---|
| 2,555,496 | Mackmann | June 5, 1951 |